Patented Jan. 9, 1934

1,942,577

UNITED STATES PATENT OFFICE 1,942,577

SULPHURIC ACID ESTER OF FATTY ACID COMPOUNDS OF HIGH MOLECULAR WEIGHT AND PROCESS OF MAKING SAME

Hugo Siebenbürger, Basel, Switzerland, assignor to Society of Chemical Industry in Basle, Basel, Switzerland No Drawing. Application May 19, 1931, Serial No. 538,605, and in Switzerland May 28, 1930

8 Claims. (Cl. 260—98)

This invention relates to the manufacture of new sulphuric acid esters of fatty acid compounds of high molecular weight which are valuable assistants in the industry of improving textile materials, and it comprises the process of making these esters, as well as the esters themselves.

According to the invention the new products are made by converting a substance of high molecular weight, containing groups which can be esterified, into the corresponding sulphuric acid esters by the action of an addition product formed from sulphur-trioxide and an organic base, such as pyridine, quinolines, dimethylaniline, picoline, trimethylamine, triethylamine, betaine, etc., in presence of an excess of the base. The esterification occurs surprisingly easily. In many cases the esterification succeeds also if the tertiary amine is replaced wholly or in part by a suitable primary or secondary amine, preferably an aromatic amine. As substances containing groups capable of esterification, forming the parent material of the invention, there may be mentioned resins, such as natural resins (shellac, pine resin and the like), colophony, or artificial resins containing groups capable of esterification, for example formaldehyde-phenol condensation products (known generally by the registered trade-mark Bakelite); also fatty acid compounds containing at least one OH-group in the fatty acid radicle, such as $\alpha$-hydroxycapric acid, $\alpha$-hydroxylauric acid, $\alpha$-hydroxymyristic acid, $\alpha$-hydroxypalmitic acid, $\alpha$-hydroxymargaric acid, $\alpha$-hydroxystearic acid, $\alpha$-hydroxyarachidic acid, coccerinic acid ($C_{31}H_{62}O_3$), hydroxy-lycopodium oleic acid, ricinoleic acid, ricinelaidic acid, ricinostearolic acid, dihydroxypalmitic acid, dihydroxystearic acid, dihydroxybehenic acid and the isomers of all of these acids, and the esters, glycerides (mono-, di- and triglycerides), amides etc. of the above acids. Among these products particularly those are valuable which are obtained from castor oil and ricinoleic acid. Finally also products, such as gum resin, may be used.

The sodium salts of the new sulphuric acid esters are readily soluble in water; they are intended for use in the textile industry.

The following examples illustrate the invention, the parts being by weight; it is to be noted that the proportions named in the examples may be varied within wide limits, and that, generally, the esterification can be accelerated by an increase in temperature and retarded by a decrease in temperature.

Example 1

80 parts of chlorosulphonic acid are allowed to drop slowly, while stirring and cooling, into 200 parts of anhydrous pyridine; pyridine sulphur trioxide is formed and in part separated in crystalline form. This suspension is allowed to run slowly into 100 parts of castor oil at 30–35° C. whilst well stirring; the temperature rises only moderately and is then maintained for several hours within the aforesaid interval. As soon as a sample diluted with water and neutralized is soluble to a clear solution, the reaction liquid is neutralized by means of caustic soda solution of 30 per cent. strength (just until alkalinity to phenolphthaleine occurs), whilst cooling, freed from precipitated sodium sulphate by filtration, and the filtrate freed from pyridine by distillation under reduced pressure at a moderate temperature (about 50° C.). There is obtained as distillation residue a viscous yellow liquid which is taken up in a small quantity of water, whereby there occurs a separation into two layers, the concentrated salt solution (sodium sulphate or sodium chloride) and the sulphoricinoleate.

The isolated sulphoricinoleate constitutes a very highly esterified product, having a degree of sulphonation of over 85 per cent differing therein from the usual Turkey red oil, which has a degree of sulphonation of about 25 per cent, and from Monopol soap, which has a degree of sulphonation of about 40 per cent (the degree of sulphonation being determined according to Dr. A. Landolt, Melliands Textilberichte 1928, pages 759–763 and 1929 pages 214–215).

By decreasing the proportion of chlorosulphonic acid used there may be obtained a sulphoricinoleate of any desired lower degree of sulphonation.

Ricinoleic acid may also be esterified with the same result.

Example 2

The procedure for carbonizing woolen piece goods may be as follows:—Dry woolen piece goods are impregnated with sulphuric acid of 4° Bé. containing per litre 1 gram of the product made as described in Example 1, dried and heated in the carbonizing oven. Owing to the presence of the product of Example 1 the wetting capacity of the acid is increased in such a degree that the wool is almost instantaneously penetrated by the acid and a uniformly carbonized product is ensured.

What I claim is:—

1. The manufacture of sulphuric acid esters by reacting, in presence of an excess of a tertiary organic base, a fatty acid compound containing at least one OH-group in the fatty acid radicle, with the addition products of sulphur-trioxide and an organic tertiary base.

2. The manufacture of sulphuric acid esters by reacting, in presence of an excess of a tertiary organic base, a fatty acid compound containing at least one OH-group and at least 10 carbon atoms in the fatty acid radicle, with the addition products of sulphur-trioxide and an organic tertiary base.

3. The manufacture of sulphuric acid esters by reacting, in presence of an excess of a tertiary organic base, a fatty acid compound containing a double bond and at least one OH-group and at least 10 carbon atoms in the fatty acid radicle, with the addition products of sulphur-trioxide and an organic tertiary base.

4. The manufacture of sulphuric acid esters by reacting, in presence of an excess of pyridine, a fatty acid compound containing a double bond and at least one OH-group and at least 10 carbon atoms in the fatty acid radicle, with the addition product of sulphur-trioxide and pyridine.

5. The manufacture of sulphuric acid esters by reacting, in presence of an excess of pyridine, a ricinoleic acid ester with the addition product of sulphur-trioxide and pyridine.

6. The manufacture of sulphuric acid esters by reacting, in presence of an excess of pyridine, castor oil with the addition product of sulphur-trioxide and pyridine.

7. The manufacture of sulphuric acid esters by reacting, in presence of an excess of pyridine, ricinoleic acid with the addition product of sulphur-trioxide and pyridine.

8. The sulphuric acid ester of castor oil, in which product the OH-group of the ricinoleic acid is completely replaced by the -O-$SO_3$H-group, and in which no other change of the molecule of the castor oil has taken place, which product forms easily soluble alkali salts the aqueous solutions of which have a pronounced wetting capacity.

HUGO SIEBENBÜRGER.